United States Patent [19]

Barlow et al.

[11] Patent Number: 4,793,681

[45] Date of Patent: Dec. 27, 1988

[54] SPLICE CRADLE

[75] Inventors: Robert W. Barlow, Canton; Timmy D. Troutman, Jersey Shore; David A. Cooper, Loganton, all of Pa.

[73] Assignee: GTE Products Corporation, Stamford, Conn.

[21] Appl. No.: 182,659

[22] Filed: Apr. 18, 1988

[51] Int. Cl.⁴ .............................................. G02B 6/36
[52] U.S. Cl. ................................................. 350/96.20
[58] Field of Search .............. 350/96.20, 96.21, 96.22

[56] References Cited

U.S. PATENT DOCUMENTS 4,627,686 12/1986 Szentesi ........................... 350/96.20
4,702,551 10/1987 Coulombe ........................ 350/96.20
4,730,893 3/1988 Burmeister ....................... 350/96.22
4,756,594 7/1988 Tiberio ............................. 350/96.21
4,759,600 7/1988 Caron et al. ..................... 350/96.21

FOREIGN PATENT DOCUMENTS 0221550 5/1987 European Pat. Off. ......... 350/96.21
1558914 1/1980 United Kingdom ............. 350/96.21

Primary Examiner—John D. Lee
Attorney, Agent, or Firm—William H. McNeill

[57] ABSTRACT

A splice cradle for use with fiber optic splices to hold such splices in place. Pairs of leaf springs are bowed towards each other to firmly engage a splice inserted therebetween.

9 Claims, 2 Drawing Sheets

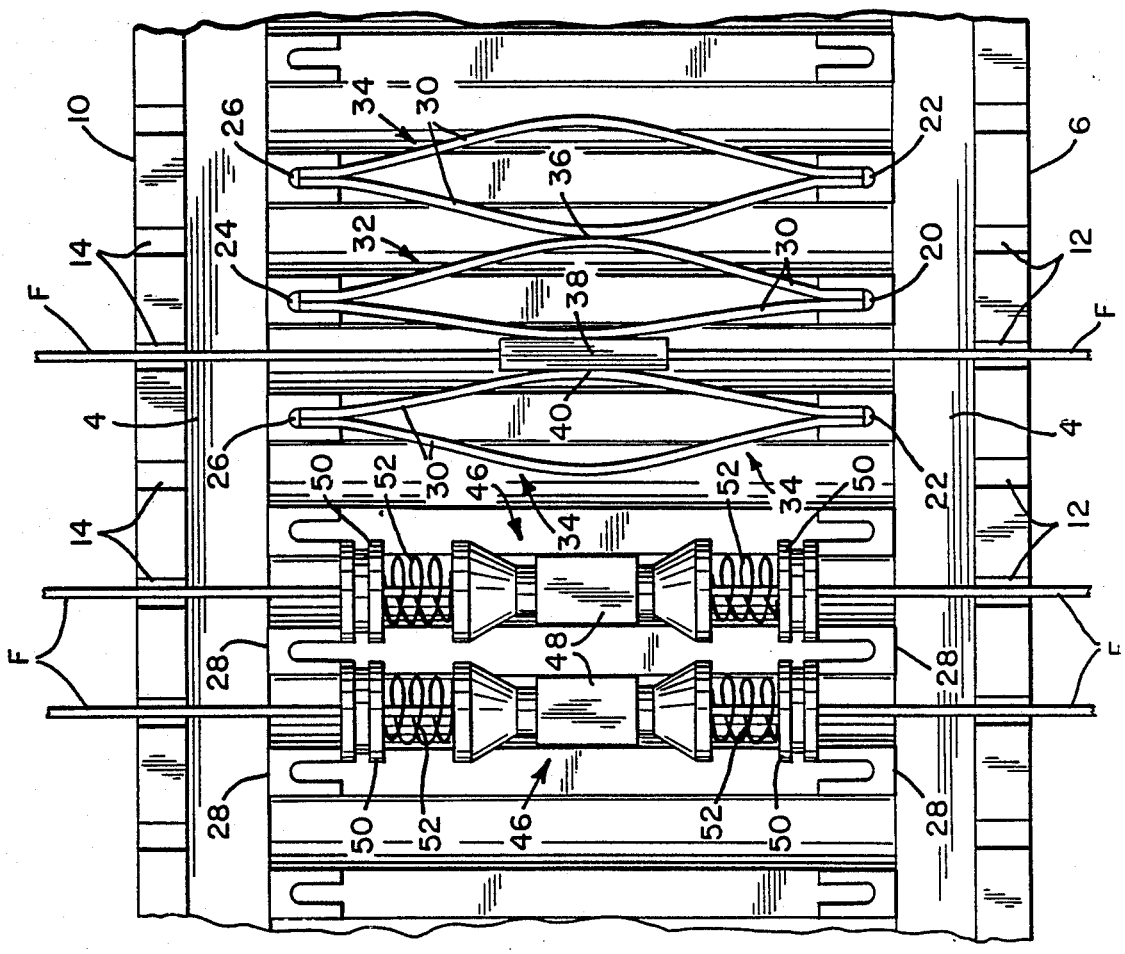

SPLICE CRADLE

BACKGROUND OF THE INVENTION

1. Field of the Invention

The present invention relates to a splice cradle for use with fiber optic splices to hold such splices in place and protect such splices from damage.

2. Description of Prior Art

The need for some mechanical means to hold in place and otherwise protect fiber optic splices is well known. Such a device is generally referred to as a splice cradle. In patent application Ser. No. 116,851 filed on Nov. 5, 1987 naming David A. Cooper and Robert W. Barlow as applicants a splice cradle is disclosed wherein fiber optic splices are protected by holding the fibers rather than the splice in place. However, generally prior art splice cradles have been used to engage the splice per se. Due to the variety of splices in existence, it has become necessary to provide a different type of splice cradle having different specific physical parameters for each different type of splice. It will be apparent that the existence of such diversity in fiber optic splices requires that the user have access to many types of splice cradles, whether the user is splicing fibers in a manufacturing facility or in the field.

It is highly desirable to provide a splice cradle which can be used with the many types and sizes of splices which the user encounters in the manufacturing facility and in the field.

It is also desirable to provide such a splice cradle which will retain a splice in place with firm spring pressure.

SUMMARY OF THE INVENTION

This invention achieves these and other results by providing a splice cradle comprising a housing having a base which includes a first peripheral edge extending in a longitudinal direction and an opposite second peripheral edge spaced from the first peripheral edge and also extending in such longitudinal direction. A plurality of entrance slots extend along the first peripheral edge and a plurality of exit slots extend along the second peripheral edge. A plurality of grooves are provided in the base and extend in a direction transverse to the longitudinal direction. Each of the entrance slots is in alignment with a corresponding one of the exit slots, and each groove is in alignment with a corresponding one of the entrance slots and exit slots. Means are associated with the base for retaining a plurality of splice retention members in place relative to the plurality of grooves.

BRIEF DESCRIPTION OF THE DRAWINGS

FIG. 2 is a partial plan view of a splice cradle of the present invention.

DESCRIPTION OF THE PREFERRED EMBODIMENT

Figure 1:
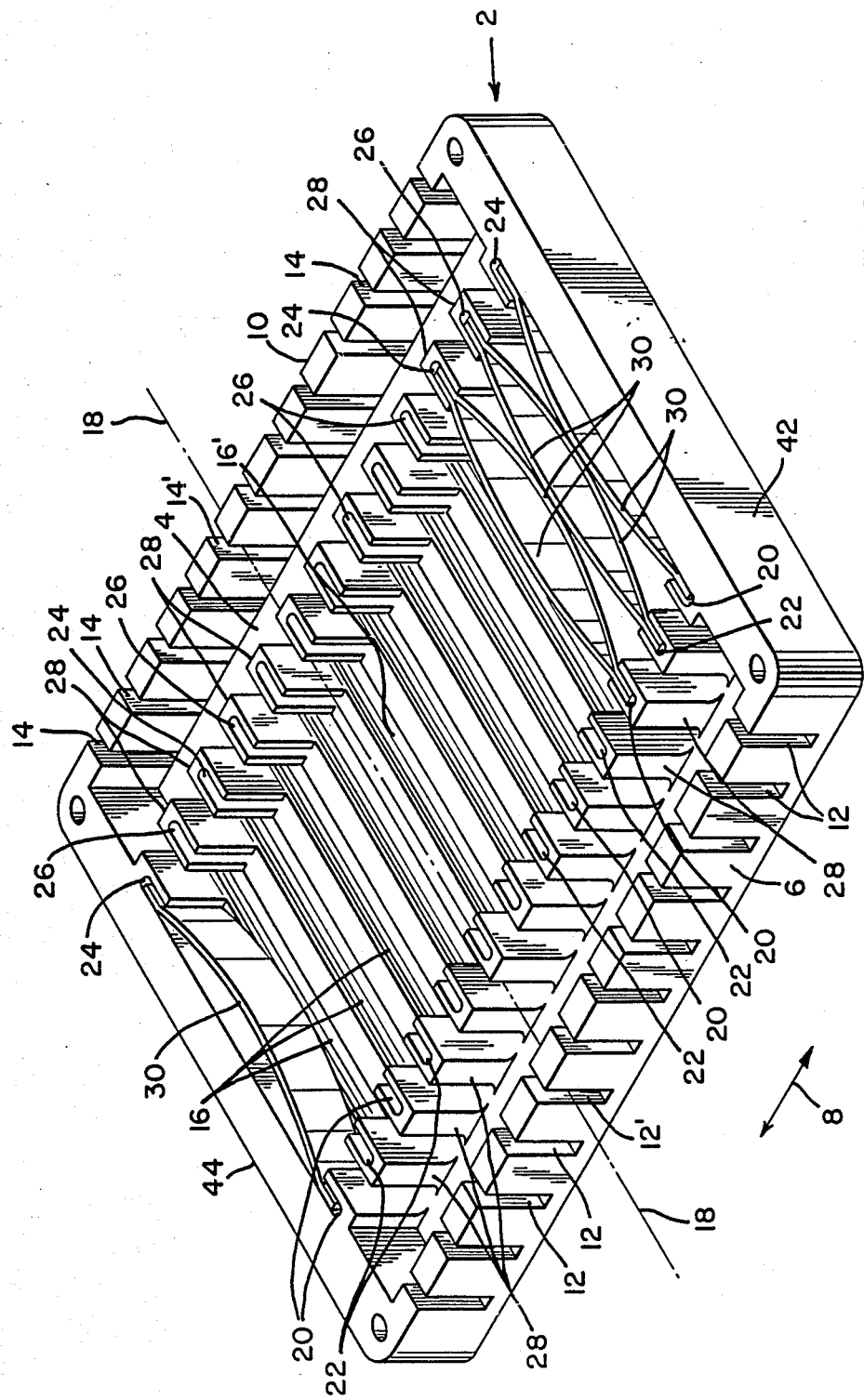
FIG. 1 is a perspective view of a splice cradle of the present invention.

The embodiment of this invention which is illustrated in the drawings is particularly suited for achieving the objects of this invention. FIG. 1 depicts a splice cradle comprising a housing 2 having a base 4. The base 4 includes a first peripheral edge 6 extending in a longitudinal direction 8 and an opposite second peripheral edge 10 spaced from first peripheral edge 6 and extending in the longitudinal direction 8. A plurality of entrance slots 12 extend along the first peripheral edge 6 and a plurality of exit slots 14 extend along the second peripheral edge 10. A plurality of grooves 16 in base 4 extend in a direction transverse to longitudinal direction 8. Each entrance slot 12 is in alignment with a corresponding exit slot 14, and each groove 16 is in alignment with a corresponding entrance slot 12 and exit slot 14. For example, entrance slot 12', exit slot 14' and groove 16' are in alignment along axis 18.

Means associated with base 4 is provided for retaining a plurality of splice retention members in place relative to the plurality of grooves 16. For example, in FIG. 1 such retaining means includes first spring slots 20 and second spring slots 22 located at one end of each groove 16 on opposite sides thereof and third spring slots 24 and fourth spring slots 26 located at an opposite end of each groove 16 on opposite sides thereof. Spring slots 20, 22, 24 and 26 are formed in respective bosses 28 which extend vertically from base 4 as depicted in the drawings. Although not necessary, the embodiment thus far described can be formed from a molded thermoplastic material.

When in use with a splice of any type other than a rotary splice, the plurality of splice retention members includes a plurality of spring members. For example, such plurality of spring members can comprise a plurality of leaf springs. In the embodiment depicted in the drawings at least one leaf spring 30 is held in place by and extends between each first spring slot 20 and each corresponding third spring slot 24, and at least one other leaf spring 30 is held in place by and extends between each second spring slot 22 and each corresponding fourth spring slot 26. Referring to FIG. 2, in the preferred embodiment first pairs 32 of two leaf springs 30 are held in place by and extend between corresponding first spring slots 20 and third spring slots 24, and second pairs 34 of two other leaf springs 30 are held in place by and extend between corresponding second spring slots 22 and fourth spring slots 26. Respective leaf springs 30 extending between first and third spring slots 20, 24 and respective leaf springs 30 extending between second and fourth spring slots 22, 26 are bowed towards each other as depicted in FIG. 2. Although only three pairs of leaf springs 30 are depicted in FIG. 2, the present invention contemplates more or less such pairs extending between corresponding opposite bosses 28 as desired. In the embodiment of FIG. 2, leaf springs 30 contact adjacent leaf springs 30 as depicted at 36 when the splice cradle is in a non-splice engaging mode. When in a splice engaging mode, as when a splice 38 is forced between adjacent leaf springs 30, such leaf springs 30 are forced out of contact with each other as at 40, and the splice 38 is retained in place by the firm spring pressure exerted against the splice by the leaf springs.

In the embodiment of FIG. 1, the base 4 includes a third peripheral edge 42 and an opposite fourth peripheral edge 44, edges 42, 44 extending transverse to the longitudinal direction 8. The first pairs 32 of two leaf springs and the second pairs 34 of two leaf springs alternate in the longitudinal direction 8 between the third edge 42 and the fourth edge 44. In this embodiment a single leaf spring 30 is provided adjacent third edge 42 and held in place by and extending between corresponding spring slots 20, 24, and a single leaf spring 30 is provided adjacent fourth edge 44 and held in place by and extending between corresponding spring slots 20, 24. Such single leaf springs are each bowed towards an adjacent leaf spring.

The splice cradle of the present invention can also be used with a rotary splice generally depicted at 46. Rotary splices per se are known in the art to include a central portion 48 into which pairs of optical fibers F extend to be spliced in a known manner. Each rotary splice 46 has opposite end portions 50 separated from the central portion 48 by respective springs 52. In the splice cradle of the present invention, the splice formed using a rotary splice 46 is held in place by removing leaf springs 30, moving opposite end portions 50 towards each other by compressing springs 52, and inserting the rotary splice between bosses 28 such that the springs 52 urge the opposite end portions 50 against respective bosses 28 as depicted in FIG. 2. In this embodiment, the opposite end portions 50 and respective helical springs 52 form the splice retention members of the present invention.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A splice cradle comprising:
   a housing having a base; said base having a first peripheral edge extending in a longitudinal direction and an opposite second peripheral edge spaced from said first peripheral edge and extending in said longitudinal direction,
   a plurality of entrance slots extending along said first peripheral edge,
   a plurality of exit slots extending along said second edge,
   a plurality of grooves in said base and extending in a direction transverse to said longitudinal direction, each of said entrance slots of said plurality of entrance slots being in alignment with a corresponding one of said exit slots of said plurality of exit slots, and each groove of said plurality of grooves being in alignment with a corresponding one of said entrance slots of said plurality of entrance slots and said exit slots of said plurality of exit slots,
   and retaining means associated with said base for retaining a plurality of splice retention members in place relative to said plurality of grooves, said retaining means including a first and second spring slot located at one end of each groove on opposite sides thereof and a third and fourth spring slot located at an opposite end of each groove on opposite sides thereof.

2. The splice cradle of claim 1 wherein said plurality of splice retention members includes a plurality of spring members.

3. The splice cradle of claim 2 wherein said plurality of spring members is a plurality of leaf springs.

4. The splice cradle of claim 3 wherein at least one leaf spring of said plurality of leaf springs in held in place by and extends between each first spring slot and each corresponding third spring slot, and at least one other leaf spring of said plurality of leaf springs is held in place by and extends between each second spring slot and each corresponding fourth spring slot.

5. The splice cradle of claim 4 wherein said at least one leaf spring and said at least one other leaf spring are bowed towards each other.

6. The splice cradle of claim 5 wherein said at least one leaf spring contacts said at least one other leaf spring in a nonsplice engaging mode and wherein said at least one leaf spring and said at least one other leaf spring are forced out of contact with each other in a splice engaging mode.

7. The splice cradle of claim 4 wherein first pairs of two leaf springs of said plurality of leaf springs are held in place by and extend between corresponding first and third spring slots, and second pairs of other two leaf springs of said plurality of leaf springs are held in place by and extend between corresponding second and fourth spring slots.

8. The splice cradle of claim 7 wherein individual leaf springs of said pairs of two leaf springs which are held in place by and extend between corresponding first and third spring slots are bowed towards adjacent individual leaf springs of said pairs of two leaf springs which are held in place by and extend between corresponding second and fourth spring slots.

9. The splice cradle of claim 8 wherein said base includes a third peripheral edge and an opposite fourth peripheral edge, said third and fourth peripheral edges extending transverse to said longitudinal direction, and wherein said first pairs of two leaf springs and said second pairs of two leaf springs alternate in said longitudinal direction between said third and fourth peripheral edges, and further including a single leaf spring of said plurality of leaf springs adjacent said third peripheral edge and held in place by and extending between corresponding spring slots, and a single leaf spring of said plurality of leaf springs adjacent said fourth peripheral edge and held in place by and extending between corresponding spring slots.

* * * * *